United States Patent
Kuger et al.

[11] 3,789,125
[45] Jan. 29, 1974

[54] PHARMACEUTICAL COMPOSITIONS CONTAINING HALO-SUBSTITUTED 2-AMINO-BENZYLAMINE-AMIDES

[75] Inventors: Gerd Kuger, Biberach/Riss; Otmar Zipp, Osnabruck; Johannes Keck, Biberach/Riss; Josef Nickl, Biberach/Riss; Hans Machleidt, Biberach/Riss; Gerhard Ohnacker, Biberach/Riss; Robert Engelhorn, Biberach/Riss; Sigfrid Püschmann, Biberach/Riss, all of Germany

[73] Assignee: Boehringer Ingelheim GmbH, Ingelheim am Rhein, Germany

[22] Filed: Oct. 24, 1972

[21] Appl. No.: 299,810

Related U.S. Application Data

[60] Division of Ser. No. 89,058, Nov. 12, 1970, Pat. No. 3,712,924, which is a continuation-in-part of Ser. No. 872,778, Oct. 30, 1969, abandoned, which is a continuation-in-part of Ser. No. 555,696, June 7, 1966, abandoned.

[30] Foreign Application Priority Data
June 8, 1965 Germany .................... 1518375

[52] U.S. Cl. .............................. 424/324, 424/330
[51] Int. Cl. ............................................ A61k 27/00
[58] Field of Search ................................... 424/324

[56] References Cited
UNITED STATES PATENTS
2,768,202  10/1956  Goldberg et al. .................. 260/588

Primary Examiner—Albert T. Meyers
Assistant Examiner—Norman A. Drezin
Attorney, Agent, or Firm—Nelson Littell et al.

[57] ABSTRACT

Antitussive and respiration-stimulating pharmaceutical compositions containing as an active ingredient a compound of the formula

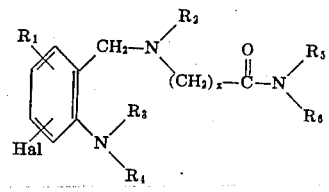

wherein
Hal is chlorine or bromine,
$R_1$ is hydrogen, chlorine or bromine,
$R_2$ is alkyl of one to four carbon atoms, allyl, phenyl, chlorophenyl, methoxyphenyl, carboxyphenyl, carbomethoxy-phenyl, tolyl, benzyl, methoxypropyl, cyclohexyl, phenethyl or dimethylaminopropyl,
$R_3$ and $R_4$ are each hydrogen, acetyl or benzoyl,
$R_5$ is hydrogen, alkyl of one to three carbon atoms or cyclohexyl,
$R_6$ is hydrogen, alkyl of one to three carbon atoms, hydroxyethyl, methoxypropyl, allyl, diethylaminoethyl, diethylamino-propyl, phenyl, fluorophenyl, benzyl or cyclohexyl, and
$n$ is 1, 2 or 3, or a non-toxic, pharmacologically acceptable acid addition salt thereof; and a method of suppressing the cough reflex and stimulating the respiration in a warm-blooded animal therewith.

2 Claims, No Drawings

PHARMACEUTICAL COMPOSITIONS CONTAINING HALO-SUBSTITUTED 2-AMINO-BENZYLAMINE-AMIDES

This is a division of copending application Ser. No. 89,058, filed Nov. 12, 1970 now U.S. Pat. No. 3,712,924, which in turn is a continuation-in-part of copending application Ser. No. 872,778, filed Oct. 30, 1969, now abandoned, which in turn is a continuation-in-part of Ser. No. 555,696, filed June 7, 1966, now abandoned.

This invention relates to novel antitussive and respiration-stimulating pharmaceutical compositions containing a halo-substituted 2-amino-benzylamine-amide or a non-toxic, pharmacologically acceptable acid addition salt thereof as an active ingredient, as well as to a novel method of suppressing the cough reflex and stimulating the respiration in a warm-blooded animal therewith.

More particularly, the present invention relates to antitussive and respiration-stimulating pharmaceutical compositions containing as an active ingredient a compound of the formula

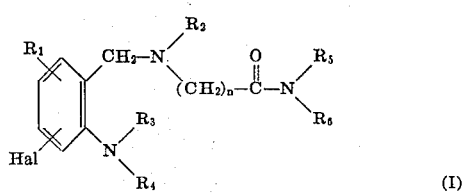

wherein
Hal is chlorine or bromine,
$R_1$ is hydrogen, chlorine or bromine,
$R_2$ is alkyl of one to four carbon atoms, allyl, phenyl, chlorophenyl, methoxyphenyl, carboxyphenyl, carbomethoxy-phenyl, tolyl, benzyl, methoxypropyl, cyclohexyl, phenethyl or dimethylaminopropyl,
$R_3$ and $R_4$ are each hydrogen, acetyl or benzoyl,
$R_5$ is hydrogen, alkyl of one to three carbon atoms or cyclohexyl,
$R_6$ is hydrogen, alkyl of one to three carbon atoms, hydroxyethyl, methoxypropyl, allyl, diethylaminoethyl, diethylamino-propyl, phenyl, fluorophenyl, benzyl or cyclohexyl, and
n is 1,2 or 3,
or a non-toxic, pharmacologically acceptable acid addition salt thereof.

The compounds embraced by formula I may be prepared by a number of different methods involving well known chemical reaction principles, among which the following has proved to be most convenient and efficient:

By reacting a halo-substituted 2-diacylaminobenzyl halide of the formula

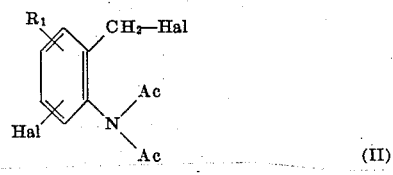

wherein $R_1$ and Hal have the same meanings as in formula I and Ac is acyl,
with an aminocarboxylic acid amide of the formula

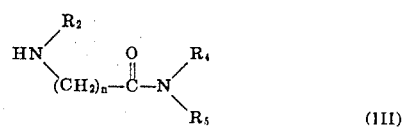

wherein $R_2$, $R_4$, $R_5$ and n have the same meanings as in formula I.

The reaction is carried out in the presence of an agent capable of typing up or neutralizing the hydrohalic acid released by the reaction, such as an inorganic or tertiary organic base or also a stoichiometric excess of the aminocarboxylic acid amide III. The reaction is preferably performed in the presence of an inert organic solvent, such as carbontetrachloride, chloroform, ethanol, acetone, benzene or toluene, and it proceeds particularly rapidly at elevated temperatures, preferably at the boiling point of the particular solvent which is employed. If an excess of the aminocarboxylic acid amide III or a tertiary organic base is used as the hydrohalic acid-binding agent, these may simultaneously serve as the solvent medium.

The compounds of formula I can also be prepared by reaction of a correspondingly substituted benzylamino carboxylic acid with a correspondingly substituted amine via the mixed anhydride with ethyl chloroformate.

In those instances where the above method yields a compound of the formula I wherein the amino group attached to the benzene nucleus is diacylated, one of these acyl groups may, if desired be split off according to conventional methods. On the other hand, if $R_3$ in formula I is hydrogen, this hydrogen atom may, if desired, be replaced by an acyl group by customary methods.

The starting materials, that is, compounds of the formulas II and III, are described in the prior art or may readily be prepared by processes described in the prior art.

For instance, a halo-substituted 2-diacylaminobenzyl halide of the formula II may be prepared by reacting a corresponding halo-substituted 2-diacylamino-toluene with N-bromo-succinimide or with a halogen under ultraviolet irradiation.

The compounds of the formula I above may be transformed into non-toxic, pharmacologically acceptable addition salts with inorganic or organic acids. Examples of non-toxic, pharmacologically acceptable acid addition salts are those formed with hydrochloric acid, hydrobromic acid, sulfuric acid, phosphoric acid, lactic acid, citric acid, tartaric acid, maleic acid, 8-chlorotheophylline or the like.

The following examples further illustrate the present invention and will enable others skilled in the art to understand it more completely,

EXAMPLE 1

Preparation of N-(2-acetylamino-3,5-dibromo-benzyl)-N-methyl-glycinamide

A mixture of 42 gm of sarcosine methyl ester hydrochloride, 1 liter of chloroform, 84 cc of triethylamine and 129 gm of 2-diacetylamino-3,5-dibromo-benzylbromide was refluxed for three hours. Thereafter, the chloroform was distilled off in vacuo, the residue was taken up in ethylacetate, and the undissolved salts were filtered off. The filtrate was again evaporated, the oily residue was taken up in 400 cc of methanol, the solution was admixed with 300 cc of 2 N sodium hydroxide, and the mixture was allowed to stand overnight at room temperature. Thereafter, the methanol was distilled off in vacuo, and the residual aqueous solution was first extracted with chloroform and then adjusted to pH 6 with 2 N hydrochloric acid. The precipitate formed thereby was separated by vacuum filtration and recrystallized from n-propanol, yielding N-(2-acetylamino-3,5-dibromo-benzyl)-N-methyl-glycine, m.p. 151°–152°C.

30 gm of this product were suspended in 300 cc of methanol, the suspension was cooled to −20°C, and then, while stirring, the suspension was admixed with a solution of 12 cc of thionylchloride in 75 cc of methanol also at −20°C, whereby everything went into solution. The solution was maintained at −15°C for 30 minutes and allowed to stand overnight at room temperature. Thereafter, the reaction solution was refluxed for 2 hours, all volatile components were evaporated in vacuo, and the residue was recrystallized first from ethylacetate and then from ethanol, yielding N-(2-acetylamino-3,5-dibromo-benzyl)-N-methyl-glycine methyl ester hydrochloride, m.p. 192°–193°C (decomp.).

10 gm of this product were suspended in a small amount of methanol, and 500 cc of methanolic ammonia were poured over the suspension. The clear solution formed thereby was allowed to stand overnight, was then evaporated in vacuo, and the residue was stirred with water. The insoluble matter was separated and recrystallized from ethanol, yielding N-(2-acetylamino-3,5-dibromo-benzyl)-N-methyl-glycin amide, m.p. 184°–186°C, of the formula

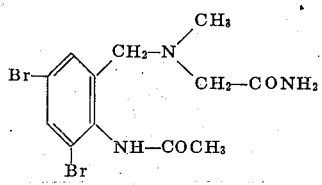

EXAMPLE 2

Preparation of N-(2-acetylamino-3,5-dibromo-benzyl)-N-methyl-glycine-[3-diethylamino-propyl-(1)-amide]

2.0 gm of N-(2-acetylamino-3,5-dibromo-benzyl)-N-methyl-glycine, obtained as in Example 1, and 0.7 cc of triethylamine were dissolved in 100 cc of warm tetrahydrofuran, the solution was cooled to −10°C, and 0.48 cc of ethyl chloroformate were added while stirring. After 10 minutes of standing 0.65 gm of N,N-diethyl-1,3-diamino-propane were added, and the mixture was allowed to come to room temperature. The reaction solution was allowed to stand for 1 hour, was then evaporated in vacuo, the residue was taken up in chloroform, the chloroform solution was washed with water, dilute ammonia and again with water, dried, and the chloroform was evaporated. The residue was recrystallized from ethylacetate, yielding N-(2-acetylamino-3,5-dibromo-benzyl)-N-methyl-glycine-[3-diethylamino-propyl-(1)-amide], m.p. 142°–144°C, of the formula

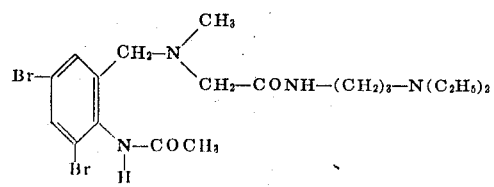

EXAMPLE 3

Using a procedure analogous to that described in Example 1, N-(2-amino-3,5-dibromo-benzyl)-N-methyl-glycin amide, m.p. 148°–150°C, was prepared from N-(2-amino-3,5-dibromo-benzyl)-N-methyl-glycine methyl ester hydrochloride.

EXAMPLE 4

Using a procedure analogous to that described in Example 2, N-(2-acetylamino-3,5-dibromo-benzyl)-N-methyl-glycine isopropylamide, m.p. 208°C, of the formula

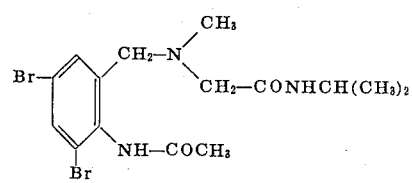

was prepared from N-(2-acetylamino-3,5-dibromo-benzyl)-N-methyl-glycine and isopropylamine,

EXAMPLE 5

Using a procedure analogous to that described in Example 2, N-(2-acetylamino-3,5-dibromo-benzyl)-N-methyl-glycine cyclohexyl amide, m.p. 178°–179°C, was prepared from N-(2-acetylamino-3,5-dibromo-benzyl)-N-methyl-glycine and cyclohexylamine.

EXAMPLE 6

Using a procedure analogous to that described in Example 2, N-(2-acetylamino-3,5-dibromo-benzyl)-N-methyl-glycine benzylamide, m.p. 142°–143°C, was prepared from N-(2-acetylamino-3,5-dibromo-benzyl)-N-methyl-glycine and benzylamine.

EXAMPLE 7

Using a procedure analogous to that described in Example 2, N-(2-acetylamino-3,5-dibromo-benzyl)-N-methyl-glycine anilide, m.p. 167°C, of the formula

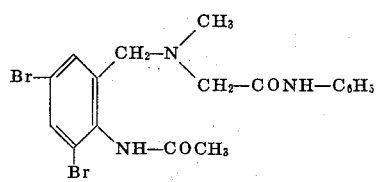

was prepared from N-(2-acetylamino-3,5-dibromo-benzyl)-N-methyl-glycine and aniline.

EXAMPLE 8

Using a procedure analogous to that described in Example 2, N-(2-acetylamino-3,5-dibromo-benzyl)-N-methyl-glycine diethylamide, m.p. 100°C, was prepared from N-(2-acetylamino-3,5-dibromo-benzyl)-N-methyl-glycine and diethylamine.

EXAMPLE 9

Using a procedure analogous to that described in Example 2, N-(2-acetylamino-3,5-dibromo-benzyl)-N-methyl-glycine-(2-hydroxyethyl-amide), m.p. 127°–128°C, of the formula

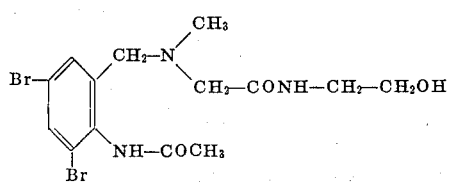

was prepared from N-(2-acetylamino-3,5-dibromo-benzyl)-N-methyl-glycine and ethanolamine.

EXAMPLE 10

Using a procedure analogous to that described in Example 2, N-(2-acetylamino-3,5-dibromo-benzyl)-N-methyl-glycine-(2-diethylamino-ethylamide), m.p. 153°–154°C, of the formula

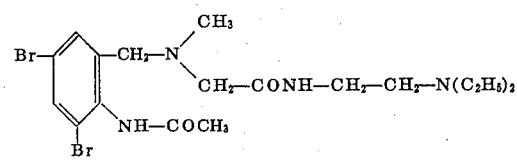

was prepared from N-(2-acetylamino-3,5-dibromo-benzyl)-N-methyl-glycine and 2-diethylamino-ethylamine.

EXAMPLE 11

Using a procedure analogous to that described in Example 2, N-(2-acetylamino-3,5-dibromo-benzyl)-N-methyl-glycine-n-propylamide, m.p. 171°C, of the formula

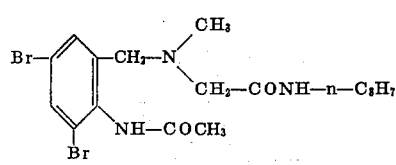

was prepared from N-(2-acetylamino-3,5-dibromo-benzyl)-N-methyl-glycine and n-propylamine.

EXAMPLE 12

Using a procedure analogous to that described in Example 2, N-(2-acetylamino-3,5-dibromo-benzyl)-N-methyl-glycine-]3-methoxy-n-propyl-(1)-amide], m.p. 125°C, of the formula

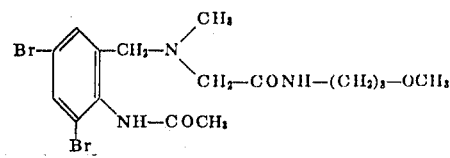

was prepared from N-(2-acetylamino-3,5-dibromo-benzyl)-N-methyl-glycine and 1-amino-3-methoxy-propane.

EXAMPLE 13

Using a procedure analogous to that described in Example 2, N-(2-acetylamino-3,5-dibromo-benzyl)-N-methyl-glycine-allylamide, m.p. 166°C, of the formula

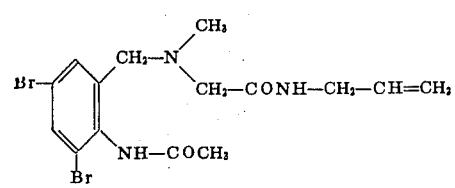

was prepared from N-(2-acetylamino-3,5-dibromo-benzyl)-N-methyl-glycine and allylamine.

EXAMPLE 14

Using a procedure analogous to that described in Example 2, N-(2-acetylamino-3,5-dibromo-benzyl)-N-methyl-glycine-(p-fluoro-anilide), m.p. 174°–175°C, of the formula

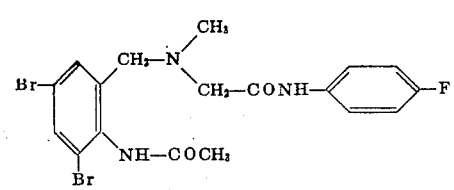

was prepared from N-(2-acetylamino-3,5-dibromo-benzyl)-N-methyl-glycine and p-fluoro-aniline.

EXAMPLE 15

Using a procedure analogous to that described in Example 2, N-(2-acetylamino-3,5-dibromo-benzyl)-N-methyl-glycine-dicyclohexylamide, m.p. 154°C, of the formula

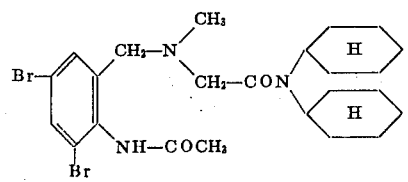

was prepared from N-(2-acetylamino-3,5-dibromo-benzyl)-N-methyl-glycine and dicyclohexylamine.

EXAMPLE 16

Using a procedure analogous to that described in Example 2, N-(2-acetylamino-3,5-dibromo-benzyl)-N-methyl-glycine-(benzyl-isopropyl-amide), an amorphous, thin-film-chromatographically uniform substance, $R_f = 0.4$ (SiO$_2$, chloroform), was prepared from N-(2-acetylamino-3,5-dibromobenzyl)-N-methyl-glycine and benzyl-isopropyl-amine.

EXAMPLE 17

Using a procedure analogous to that described in Example 1, γ-[N-(2-acetylamino-3,5-dibromo-benzyl)-N-iso-propyl]-amino-butyric acid diethylamide, a colorless oil, thin-film-chromatographically uniform, $R_f = 0.6$ (SiO$_2$, chloroform : methanol - 5:1), of the formula

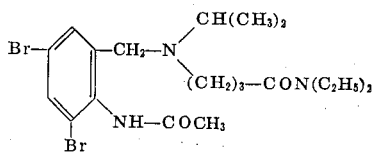

was prepared from 2-diacetylamino-3,5-dibromo-benzyl bromide and γ-isopropylamino-butyric acid diethylamide.

EXAMPLE 18

Using a procedure analogous to that described in Example 2, N-(2-acetylamino-4-bromo-benzyl)-N-methyl-glycine-benzylamide, m.p. 169°–171°C, was prepared from N-(2-acetyl-amino-4-bromo-benzyl)-N-methyl-glycine and benzylamine.

EXAMPLE 19

Using a procedure analogous to that described in Example 2, N-(2-acetylamino-5-bromo-benzyl)-N-methyl-glycine-benzylamide, m.p. 177°–178°C, was prepared from N-(2-acetyl-amino-5-bromo-benzyl)-N-methyl-glycine and benzylamine.

EXAMPLE 20

Using a procedure analogous to that described in Example 2, N-(2-acetylamino-3,5-dibromo-benzyl)-N-ethyl-glycine-benzylamide, m.p. 149°C, was prepared from N-(2-acetylamino-3,5-dibromo-benzyl)-N-ethyl-glycine and benzyl-amine.

EXAMPLE 21

Using a procedure analogous to that described in Example 2, N-(2-acetylamino-3,5-dibromo-benzyl)-N-(n-butyl)-glycine-benzylamide, m.p. 106°C, was prepared from N-(2-acetylamino-3,5-dibromo-benzyl)-N-(n-butyl)-glycine and benzylamine.

EXAMPLE 22

Using a procedure analogous to that described in Example 2, N-(2-acetylamino-6-chloro-benzyl)-N-methyl-glycine-benzylamide m.p. 114°–115°C, was prepared from N-(2-acetyl-amino-6-chloro-benzyl)-N-methyl-glycine and benzylamine.

EXAMPLE 23

Using a procedure analogous to that described in Example 2, N-(2-acetylamino-6-chloro-benzyl)-N-ethyl-glycine benzylamide, m.p. 100°–101°C, was prepared from N-(2-acetyl-amino-6-chloro-benzyl)-N-ethylglycine and benzylamine.

EXAMPLE 24

Using a procedure analogous to that described in Example 2, N-(2-benzoylamino-6-chloro-benzyl)-N-methyl-glycine-isopropylamide, m.p. 153°–155°C, was prepared from N-(2-benzoylamino-6-chloro-benzyl)-N-methyl-glycine and isopropylamine.

EXAMPLE 25

Using a procedure analogous to that described in Example 2, N-(2-benzoylamino-6-chloro-benzyl)-N-methyl-glycine-benzylamide, an amorphous, thin-film-chromatographically uniform substance, $R_f = 0.75$ (SiO$_2$, chloroform:methanol - 19:1), was prepared from N-(2-benzoylamino-6-chloro-benzyl)-N-methyl-glycine and benzylamine.

EXAMPLE 26

Using a procedure analogous to that described in Example 2, N-(2-benzoylamino-6-chloro-benzyl)-N-methyl-glycine-anilide, m.p. 142°C, was prepared from N-(2-benzoyl-amino-6-chloro-benzyl)-N-methyl-glycine and aniline.

EXAMPLE 27

Using a procedure analogous to that described in Example 2, N-(2-benzoylamino-6-chloro-benzyl)-N-methyl-glycine-diethylamide, m.p. 98°–101°C, was prepared from N-(2-benzoylamino-6-chloro-benzyl)-N-methyl-glycine and diethyl-amine.

EXAMPLE 28

Using a procedure analogous to that described in Example 2, N-(2-benzoylamino-3,5-dibromo-benzyl)-N-ethyl-glycinamide, m.p. 173°–174°C, was prepared from N-(2-benzoyl-amino-3,5-dibromo-benzyl)-N-ethyl-glycine and concentrated ammonia.

EXAMPLE 29

Using a procedure analogous to that described in Example 2, N-(2-benzoylamino-3,5-dibromo-benzyl)-N-ethyl-glycine-isopropylamide, m.p. 170°–172°C, was prepared from N-(2-benzoylamino-3,5-dibromo-benzyl)-N-ethyl-glycine and isopropylamine.

EXAMPLE 30

Using a procedure analogous to that described in Example 2, N-(2-benzoylamino-5-chloro-benzyl)-N-methyl-glycinamide, m.p. 155°–157°C, was prepared from N-(2-benzoyl-amino-5-chloro-benzyl)-N-methyl-glycine and concentrated ammonia.

EXAMPLE 31

Using a procedure analogous to that described in Example 2, N-(2-benzoylamino-5-chloro-benzyl)-N-methyl-glycine-isopropylamide, m.p. 122°–124°C, was prepared from N-(2-benzoylamino-5-chloro-benzyl)-N-methyl-glycine and isopropylamine.

EXAMPLE 32

Using a procedure analogous to that described in Example 2, N-(2-benzoylamino-5-chloro-benzyl)-N-methyl-glycine-cyclohexylamide, m.p. 190°–192°C, was prepared from N-(2-benzoylamino-5-chloro-benzyl)-N-methyl-glycine and cyclohexylamine.

EXAMPLE 33

Using a procedure analogous to that described in Example 2, N-(2-benzoylamino-5-chloro-benzyl)-N-methyl-glycine-anilide, m.p. 157°–159°C, was prepared from N-(2-benzoylamino-5-chloro-benzyl)-N-methyl-glycine and aniline.

EXAMPLE 34

Using a procedure analogous to that described in Example 2, N-(2-benzoylamino-4-chloro-benzyl)-N-methyl-glycin-amide, m.p. 131°–132°C, was prepared from N-(2-benzoyl-amino-4-chloro-benzyl)-N-methyl-glycine and concentrated ammonia.

EXAMPLE 35

Using a procedure analogous to that described in Example 2, N-(2-benzoylamino-4-chloro-benzyl)-N-methyl-glycine-allylamide, m.p. 97°–98°C, was prepared from N-(2-benzoyl-amino-4-chloro-benzyl)-N-methyl-glycine and allylamine.

EXAMPLE 36

Using a procedure analogous to that described in Example 2, N-(2-benzoylamino-4-chloro-benzyl)-N-methyl-glycine-isopropylamide, m.p. 110°–111°C, was prepared from N-(2-benzoylamino-4-chloro-benzyl)-N-methyl-glycine and isopropylamine. Its hydrochloride, prepared with anhydrous hydrochloric acid, has a melting point of 189°–193°C (decomp.).

EXAMPLE 37

Using a procedure analogous to that described in Example 2, N-(2-benzoylamino-4-chloro-benzyl)-N-methyl-glycine-cyclohexylamide, m.p. 138°–139°C, was prepared from N-(2-benzoylamino-4-chloro-benzyl)-N-methyl-glycine and cyclohexylamine.

EXAMPLE 38

Using a procedure analogous to that described in Example 2, N-(2-benzoylamino-4-chloro-benzyl)-N-methyl-glycine-benzylamide, m.p. 141°–142°C, was prepared from N-(2-benzoylamino-4-chloro-benzyl)-N-methyl-glycine and benzylamine.

EXAMPLE 39

Using a procedure analogous to that described in Example 2, N-(2-benzoylamino-4-chloro-benzyl)-N-methyl-glycine-anilide, m.p. 144°–145°C, was prepared from N-(2-benzoylamino-4-chloro-benzyl)-N-methyl-glycine and aniline.

The compounds embraced by formula I above and their non-toxic, pharmacologically acceptable acid addition salts have useful pharmacodynamic properties. More particularly, they exhibit antitussive and respiration-stimulating activities in warm-blooded animals.

For pharmaceutical purposes, the compounds embraced by formula I are administered to warm-blooded animals perorally, parenterally or rectally as active ingredients in customary dosage unit compositions, that is, compositions in dosage unit form consisting essentially of an inert pharmaceutical carrier and one dosage unit of the active ingredient, such as tablets, coated pills, solutions, syrups, suspensions, capsules, wafers, suppositories and the like. One dosage unit of a compound embraced by formula I is from 0.166 to 5.0 mgm/kg, preferably 0.33 to 1.67 mgm/kg body weight.

The following examples illustrate a few pharmaceutical dosage unit compositions comprising a compound embraced by formula I as the active ingredient. The parts are parts by weight, unless otherwise specified.

EXAMPLE 40

Syrup

The syrup was compounded from the following ingredients:

| | parts by volume |
|---|---|
| N-(2-benzoylamino-4-chloro-benzyl)-N-methyl-glycine-isopropylamide hydrochloride | 0.5 |
| Tartaric acid | 0.5 |
| Ammonium chloride | 0.4 |
| Benzoic acid | 0.2 |
| Sugar | 65.0 |
| Sodium pyrosulfite | 0.1 |
| Flavoring | 0.2 |
| Certified food colors | 0.002 |
| Ethanol | 10.0 |
| Distilled water q.s.ad | 100.0 |

Compounding procedure:

The distilled water was heated to 80°C, and then the benzoic acid, the tartaric acid, the ammonium chloride, the glycinamide compound, the food colors and the sugar were successively dissolved therein. The resulting syrup was cooled to room temperature, the sodium pyrosulfite was dissolved therein, and then a mixture of the flavoring and the ethanol was stirred in. The finished syrup was filtered through a suitable filter. 5 cc of the finished syrup contained 25 mgm of the active ingredient and, when administered perorally to a warm-blooded animal of about 60 kg body weight in need of such treatment, produced very good antitussive and respiration-stimulating effects.

EXAMPLE 41

Drop Solution

The solution was compounded from the following ingredients:

| | parts by volume |
|---|---|
| N-(2-acetylamino-6-chloro-benzyl)-N-(methyl)-glycine-benzylamide | 5.0 |
| p-Hydroxybenzoic acid methyl ester | 0.07 |
| p-Hydroxybenzoic acid propyl ester | 0.03 |
| Polyvinylpyrrolidone | 5.00 |
| Distilled water q.s.ad | 100.00 |

Compounding procedure:

The p-hydroxybenzoic acid esters, the polyvinylpyrrolidone and the glycine compound were successively dissolved in a sufficient amount of distilled water at 80°C. The resulting solution was cooled to room temperature, diluted with additional distilled water to the desired volume, and the solution was filtered until free from suspended particles. 1 cc of solution contained 50 mgm of the active ingredient and, when administered perorally to a warm-blooded animal of about 60 kg body weight in need of such treatment, produced very good antitussive and respiration-stimulating effects.

EXAMPLE 42

Coated pills

The pill cores were compounded from the following ingredients:

| | parts |
|---|---|
| N-(2-acetylamino-3,5-dibromo-benzyl)-N-methyl-glycinamide | 25.0 |
| Lactose | 120.0 |
| Potato starch | 67.0 |
| Polyvinylpyrrolidone | 6.0 |
| Magnesium stearate | 2.0 |
| Total | 220.0 |

Compounding procedure:

The glycinamide compound, the lactose and the potato starch were intimately admixed with each other, the mixture was moistened with an aqueous 12.5 percent solution of the polyvinylpyrrolidone, and the moist mass was forced through a 1.5 mm-mesh screen. The resulting granulate was dried at 45°C and again passed through a 1.0 mm-mesh screen. The dry granulate was then thoroughly admixed with the magnesium stearate, and the mixture was compressed into 220 mgm-pill cores, which were subsequently coated with a thin shell consisting essentially of talcum and sugar. The coated pills were finally polished with beeswax. Each pill contained 25 mgm of the active ingredient and, when administered perorally to a warm-blooded animal of about 60 kg body weight in need of such treatment, produced very good antitussive and respiration-stimulating effects.

EXAMPLE 43

Tablets

The tablet composition was compounded from the following ingredients:

| | parts |
|---|---|
| N-(2-acetylamino-3,5-dibromo-benzyl)-N-(n-butyl)-glycine-benzylamide | 50.0 |
| Lactose | 233.0 |
| Potato starch | 100.0 |
| Gelatin | 8.0 |
| Colloidal silicic acid | 5.0 |
| Magnesium stearate | 4.0 |
| Total | 400.0 |

Compounding procedure:

The glycinamide compound, the lactose and the potato starch were intimately admixed with each other, and the mixture was moistened with an aqueous 10 percent solution of the gelatin. The moist mass was forced through a 1.5 mm-mesh screen, and the resulting granulate was dried at 45°C and again passed through the screen. The dry granulate was thoroughly admixed with the silicic acid and with the magnesium stearate, and the mixture was compressed into 400 mgm-tablets. Each tablet contained 50 mgm of the active ingredient and, when administered perorally to a warm-blooded animal of about 60 kg body weight in need of such treatment, produced very good antitussive and respiration-stimulating effects.

EXAMPLE 44

Suppositories

The suppository composition was compounded from the following ingredients;

| | parts |
|---|---|
| N-(2-benzoylamino-4-chloro-benzyl)-N-methyl-glycine-isopropylamide | 25.0 |
| Cocoa butter | 1675.0 |
| Total | 1700.0 |

Compounding procedure:

The finely powdered glycinamide compound was stirred in the cocoa butter, which had previously been melted and cooled to 40°C, and the mixture was homogenized. The composition was then poured at about 37° C into cooled suppository molds, each holding 1700 mgm of the mixture. Each suppository contained 25 mgm of the active ingredient and, when administered by the rectal route to a warm-blooded animal of about 60 kg body weight in need of such treatment, produced very good antitussive and respiration-stimulating effects.

EXAMPLE 45

Hypodermic Solution

The solution was compounded from the following ingredients:

| | parts |
|---|---|
| N-(2-acetylamino-3,5-dibromo-benzyl)-N-(n-butyl)-glycine-benzylamide | 20.0 |
| Tartaric acid | 2.0 |
| Sorbitol | 50.0 |
| Distilled water q.s.ad | 1000.0 |

Compounding procedure:

The tartaric acid, the glycinamide compound and the sorbitol were successively dissolved in a sufficient amount of warm distilled water. The solution was cooled to room temperature, diluted with distilled water to the desired volume, and filtered until free from suspended matter. The solution was then filled into white 1 cc-ampules, which were then selaed and sterilized for twenty minutes at 120° C. Each ampule contained 20 mgm of the active ingredient, and when the contents thereof were administered parenterally to a warm-blooded animal of about 60 kg body weight in need of such treatment, very good antitussive and respiration-stimulating effects were obtained.

Analogous results were obtained when any one of the other compounds embraced by formula I or a non-toxic pharmacologically acceptable acid addition salt thereof was substituted for the particular halo-substituted 2-amino-benzylamine-amide compound in illustrative Examples 40 to 45. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A pharmaceutical dosage unit composition consisting essentially of an inert pharmaceutical carrier and an effective antitussive and respiration-stimulating amount of a compound of the formula

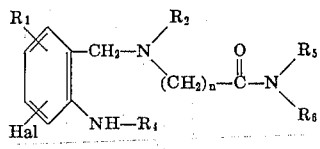

wherein
- Hal is chlorine or bromine,
- $R_1$ is hydrogen, chlorine or bromine,
- $R_2$ is alkyl of one to four carbon atoms,
- $R_4$ is acetyl or benzoyl,
- $R_5$ is hydrogen, alkyl of one to three carbon atoms or cyclohexyl,
- $R_6$ is hydrogen, alkyl of one to three carbon atoms, hydroxyethyl, methoxypropyl, allyl, diethylamino-ethyl, diethylamino-propyl, phenyl, fluorophenyl, benzyl or cyclohexyl, and
- $n$ is 1, 2 or 3, or a non-toxic, pharmacologically acceptable acid addition salt thereof.

2. The method of suppressing the cough reflex and stimulating the respiration in a warm-blooded animal in need thereof, which comprises administering to said animal an effective antitussive and respiration-stimulating amount of a compound of the formula

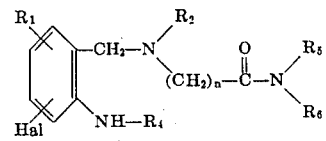

wherein
- Hal is chlorine or bromine,
- $R_1$ is hydrogen, chlorine or bromine,
- $R_2$ is alkyl of one to four carbon atoms,
- $R_4$ is acetyl or benzoyl,
- $R_5$ is hydrogen, alkyl of one to three carbon atoms or cyclohexyl,
- $R_6$ is hydrogen, alkyl of one to three carbon atoms, hydroxyethyl, methoxypropyl, allyl, diethylaminoethyl, diethylamino-propyl, phenyl, fluorophenyl, benzyl or cyclohexyl, and
- $n$ is 1, 2 or 3, or a non-toxic, pharmacologically acceptable acid addition salt thereof.

* * * * *